(No Model.)

J. W. BARTLETT.
WHEEL PLOW.

No. 296,720. Patented Apr. 15, 1884.

Attest.
Sidney P. Hollingsworth
Harry Shipley

Inventor.
John W. Bartlett
By his Attorney,
Philip T. Dodge.

UNITED STATES PATENT OFFICE.

JOHN W. BARTLETT, OF MOLINE, ILLINOIS, ASSIGNOR TO THE MOLINE PLOW COMPANY, OF SAME PLACE.

WHEEL-PLOW.

SPECIFICATION forming part of Letters Patent No. 296,720, dated April 15, 1884.

Application filed October 26, 1883. (No model.)

*To all whom it may concern:*

Be it known that I, JOHN W. BARTLETT, of Moline, in the county of Rock Island and State of Illinois, have invented certain Improvements in Wheeled-Plows, of which the following is a specification.

This invention relates more particularly to that class of wheeled or sulky plows in which the forward end of the plow-carrying frame is provided with a ground-wheel swiveled in such manner as to swing horizontally, for the purpose of steering or guiding the machine.

The invention has reference to draft devices of improved construction connected with the swiveling-wheel support for the purpose of keeping the wheel constantly in the line of draft, and for permitting a lateral adjustment of the draft devices with respect to the machine, as will be hereinafter more fully explained.

Figure 1:
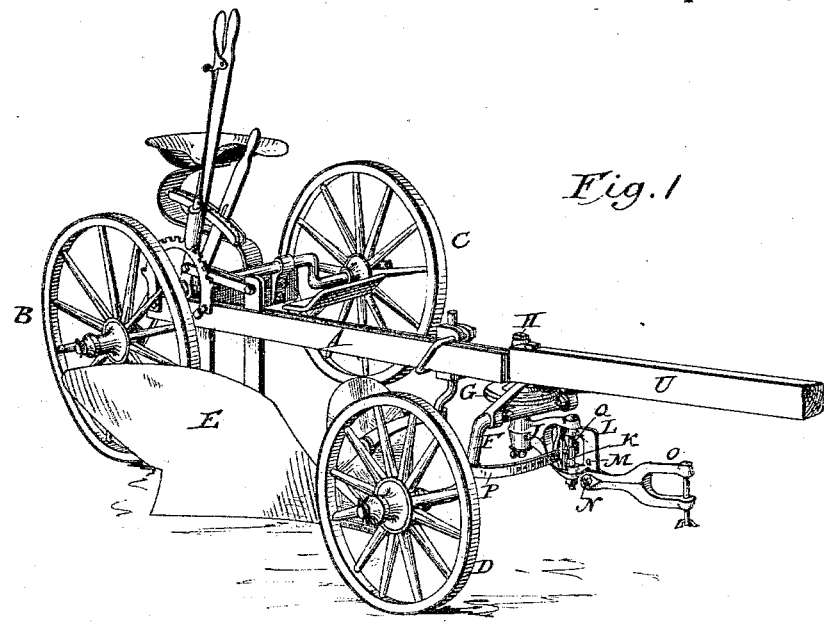
Figures 2, 3:
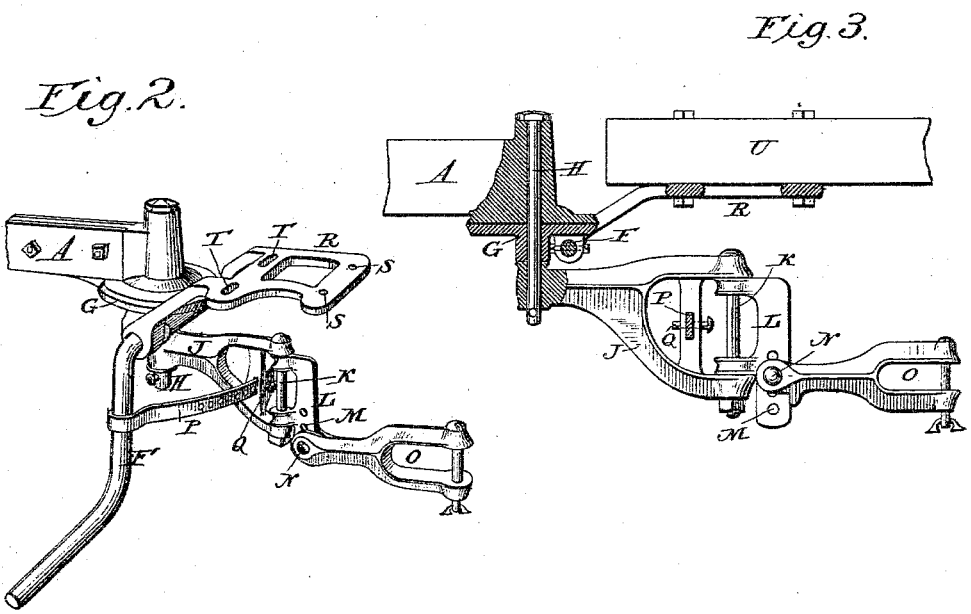

Referring to the drawings, Figure 1 represents a perspective view of a plow having the improvements embodied therein; Fig. 2, a perspective view of the draft devices on a larger scale; Fig. 3, a longitudinal vertical section through the center of the draft devices.

Referring to the drawings, A represents a longitudinal reach-bar or frame, the rear end of which is sustained by two ground-wheels, B and C, and the forward end by the ground-wheel D. The rear wheels may be connected with the frame rigidly by means such as are represented in the drawings, or in any other suitable manner, the invention having no relation to these parts.

E represents an ordinary mold-board plow, connected with the frame near its rear end by means of adjustable devices such as are now in use. The front or steering wheel, D, is applied to the lower end of a cranked-axle, F, the upper end of which is inserted through ears on the under side of a horizontal rotary plate, G. This plate bears at its upper face beneath a corresponding plate or head bolted firmly to the forward end of the reach-bar A. The two plates are united by the vertical king-bolt H, which is extended downward through them and projected on the under side, as represented in Fig. 2. On the lower end of the king-bolt there is mounted a laterally-swinging draft arm or clevis, J, the forward end of which is forked, to sustain the two ends of a vertical bolt, K, which passes through the rear edge of a vertical plate, L, the latter being provided in its forward edge, at different heights, with a series of holes, M, designed to receive the horizontal pivot N, by which the clevis or draft device O is attached thereto. The arm J is secured in position on the lower end of the king-bolt by means of a washer and a pin passed through the bolt, as shown, or by a nut or other equivalent fastening device. The fact that the arm J is mounted or swiveled upon the lower end of the king-bolt admits of its forward end being swung laterally or in a horizontal direction, in order to permit the line of draft to be shifted toward one side or the other of the plow, as occasion may require.

For the purpose of holding the arm J rigidly in position, a curved bar, P, is provided, one end of this bar being clasped around the vertical portion of the axle, while the opposite and perforated end is inserted through a slot formed for the purpose in the arm J, and secured by means of a pin, Q, inserted through both parts, as represented in the drawings.

It will be observed that the perforated bar and pin admit of the forward end of the arm J being moved laterally and secured firmly at any desired point, thus causing the draft devices connected with said arm to apply the propelling strain or draft in a line farther to the right or the left, with respect to the plow, as before alluded to. The connection of the plate L to the arm J, by means of the vertical pivot K, permits the plate L and the draft devices connected therewith to swing freely in a horizontal direction. The series of holes M admit of the clevis O being raised or lowered to apply the draft at different heights. The forward end of the clevis O is forked or divided, as usual, to admit the double-tree, which will be secured therein by the usual vertical pivot-pin.

For the purpose of connecting the draft-pole or tongue the plate R is provided, the rear end of which is forked or divided, and its two arms journaled around the horizontal portion of the axle on opposite sides of the swiveling plate G. The plate is extended horizontally forward, and is provided, as shown, with holes S and slots T to receive vertical bolts, by which the tongue or pole U may be attached, as represented in Fig. 1.

It will be seen that there are two holes, S, and two corresponding slots in the rear. The tongue is attached by two bolts, the forward bolt passing through one of the holes, and the rear bolt through the corresponding slot. The employment of the slot admits of the tongue being swung around the forward bolt as a pivot, and thus adjusted laterally. The provision of the two holes and corresponding slots admits of the tongue being detached from one edge of the plate and applied to the other, as circumstances may render advisable. When the tongue is bolted firmly to the plate R, the latter will serve to swing the axle and its connections in a horizontal direction, so that the wheel upon the outer end of the axle F will at all times follow exactly the line of draft.

The connection of the draft devices to the lower end of the king-bolt is advantageous in that the parts are maintained in their proper positions, and prevented from swagging and swaying out of shape under the influence of the strains to which they are subjected.

The connection of the arm or draft device J with the axle F, as shown, is advantageous in that the wheel is controlled in such manner as to effectually avoid a side draft of the machine.

It will be perceived that the axle is extended on the furrow side of the plow, so that the wheel D will travel immediately in advance and outside of the mold-board or plow proper.

The present invention is restricted to those matters and things which are hereinafter claimed, and as to all matters which may be described or shown, but which are not claimed, the right is reserved to make the same the subject of a separate application.

I am aware that wheeled plows have been provided with swiveled leading-wheels; also, that the axles of such wheels have been connected with the draft devices, so that the position of the wheel was governed by the draft, the construction being such that the angular position of the draft devices with respect to the wheel was not adjustable.

I am further aware that a swiveled leading-wheel has been combined with swiveled draft devices, by means of an intermediate link, in such manner that an angular movement of the draft devices would cause a far greater angular movement of the wheel; and to such constructions I lay no claim.

It is to be noted that in my plow the angular position of the wheel with respect to the draft devices may be varied at the will of the operator, but that when adjusted the draft devices and the wheel retain fixed, unchanging relations to each other while in action.

In my plow the leading-wheel being set at a given angle to the right or left of the line of draft will retain that angle while in action.

I believe myself to be the first to combine, with the draft devices and with the wheel, means by which the wheel may be inclined toward or away from the line to a greater or less extent, as required, and caused to retain its position with respect to the draft devices and while controlled and guided thereby.

Having thus described my invention, what I claim is—

1. A frame carrying a mold-board plow and provided with rear sustaining-wheels, in combination with a swiveled leading-wheel arranged to travel in the preceding furrow, an independently-swiveling draft device, and an adjustable connection, substantially as described, whereby the draft device and wheel may be maintained in fixed relations to each other while in action, but an angular adjustment of one with respect to the other permitted at will, whereby the leading-wheel may be caused to travel constantly in one line or another with respect to the line of draft.

2. The draft-frame, the plate connected thereto by the king-bolt, the axle extending through the plate, the tongue-plate journaled on the axle, the draft devices connected to the king-bolt, and the connection between the draft devices and axle, said parts being combined substantially as described.

3. In combination with the draft-frame, and the axle connected therewith by the king-bolt, the draft-arm mounted on the lower end of the king-bolt, and the adjustable bar or brace connecting the draft-arm with the outer end of the axle.

4. In a draft mechanism for a wheeled plow, a swiveling axle, a tongue, connecting devices whereby the tongue is caused to turn the axle, draft devices adjustable laterally around the pivot of the axle, and adjustable connections between said draft devices and the axle, substantially as described, whereby the wheel is caused to follow the line of draft and the lateral adjustment of the draft devices permitted.

5. In a wheeled plow, the axle movable around a vertical pivot, combined with a draft-arm movable independently around the same pivot, and intermediate devices for securing the lateral adjustment of the draft-arm with respect to the axle, substantially as shown.

6. In combination with a plow-carrying frame having sustaining-wheels at the rear, a leading-wheel mounted on a swiveling axle and adapted to travel in the preceding furrow, a horizontally-swiveling draft device, an adjustable connection whereby the wheel and draft device may be adjusted and fixed in position with respect to each other, as described, and a pole or tongue fixed to the swiveled axle by devices substantially as described, and adapted to permit a horizontal angular adjustment of the tongue with respect to the wheel and draft devices, whereby the angular positions of the tongue, wheel, and draft devices may be varied independently of each other, or fixed while in action.

JOHN W. BARTLETT.

Witnesses:
C. F. HEMENWAY,
SOL. HIRSCH.